United States Patent [19]
Logos

[11] 3,918,173
[45] Nov. 11, 1975

[54] TEACHING AID
[76] Inventor: Jean Logos, 2616 Renan, Switzerland
[22] Filed: Feb. 11, 1974
[21] Appl. No.: 441,280

[30] Foreign Application Priority Data
Mar. 27, 1973 Switzerland.......................... 4433/73

[52] U.S. Cl............................. 35/9 R; 35/75; 35/69
[51] Int. Cl.².......................................... G09B 1/16
[58] Field of Search .......... 35/75, 31 R, 31 B, 31 E, 35/32, 33, 74, 69–72, 8 R, 9 R

[56] References Cited
UNITED STATES PATENTS

| | | | |
|---|---|---|---|
| 637,964 | 11/1899 | Johnsen | 35/33 |
| 805,365 | 11/1905 | Knappe | 35/33 |
| 845,798 | 3/1907 | Lehr | 35/75 UX |
| 1,525,342 | 2/1925 | Van Order | 35/75 X |
| 2,894,337 | 7/1959 | Rawlings | 35/75 |
| 3,248,809 | 5/1966 | Stifano | 35/75 |
| 3,707,045 | 12/1972 | O'Hare | 35/74 |

Primary Examiner—Wm. H. Grieb
Attorney, Agent, or Firm—Anthony J. Casella

[57] ABSTRACT

A teaching aid comprising at least two groups of items of information respectively distributed over at least two supports, the items of information within each of the said groups of information being independent of each other and with no connection between them, whilst each of the items of information within one of the said groups corresponds to the same subject as one of the items of information within the other group of information, each item of information being disposed on a face of its support and indicated by a checking sign disposed on a face of said support which is opposite the face on which the item of information is placed, the checking signs indicating the items of information corresponding to the same subject being identical.

8 Claims, 18 Drawing Figures

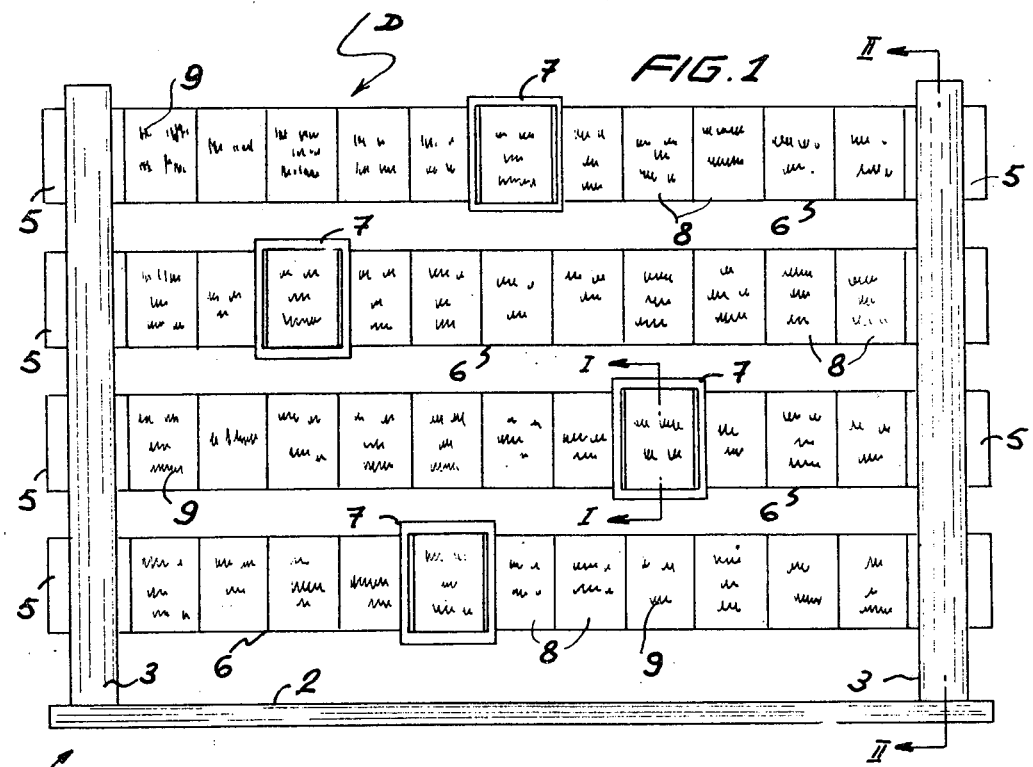
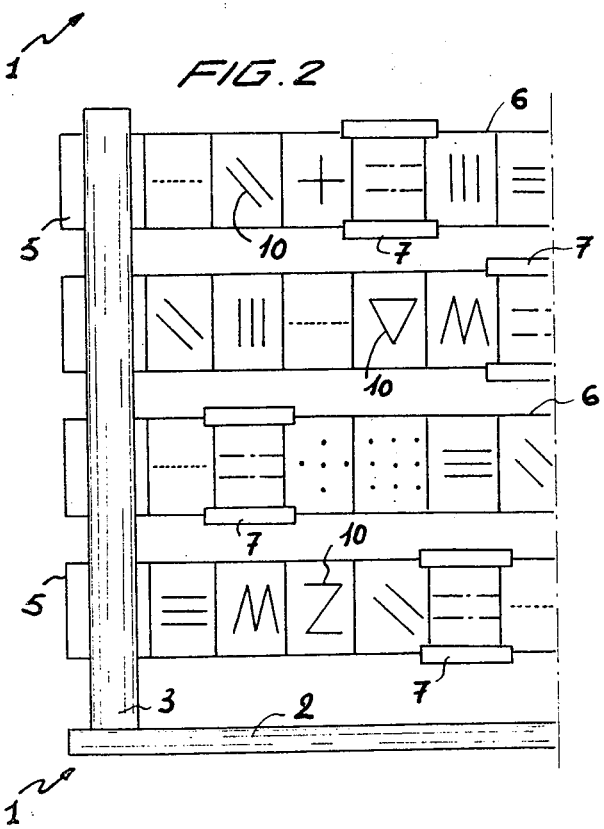
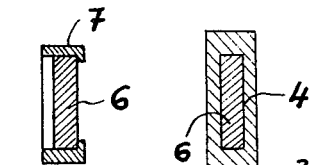
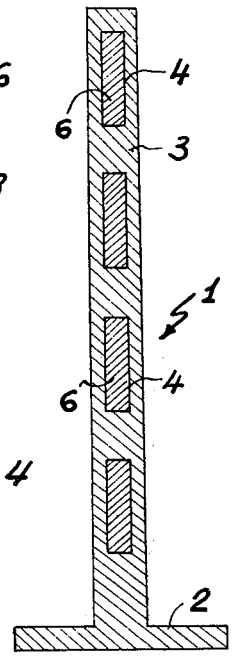

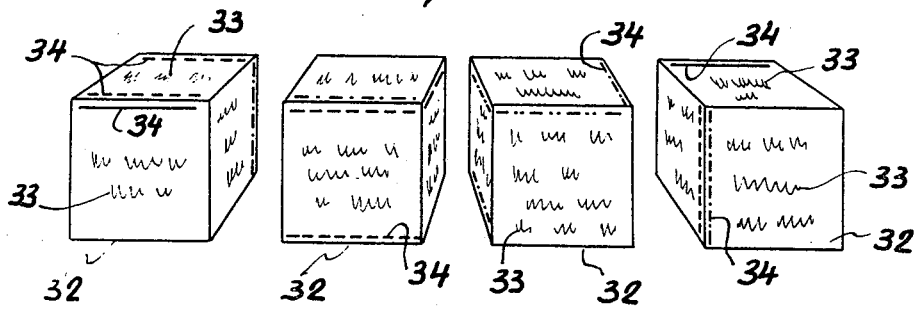
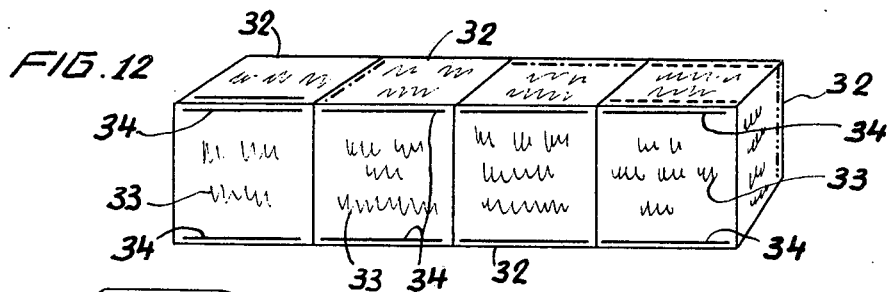
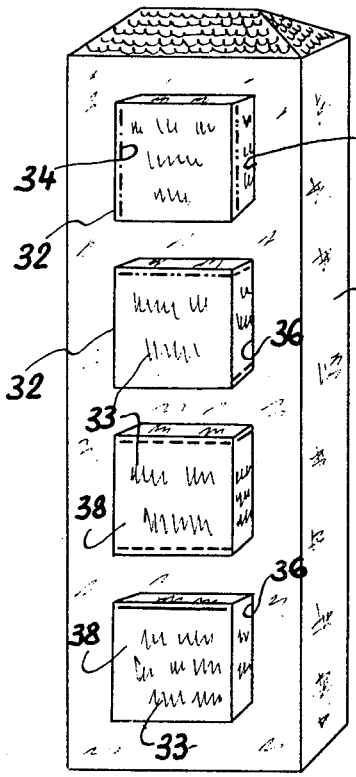
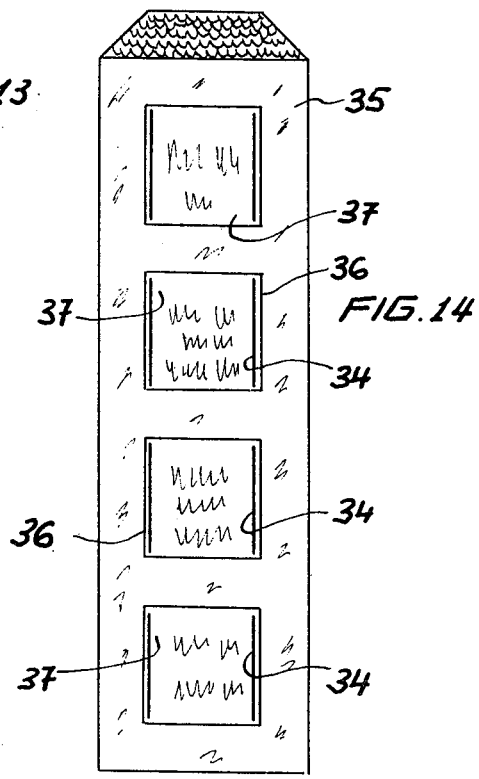

TEACHING AID

The present invention concerns a teaching aid, comprising at least two groups of items of information respectively distributed over at least two supports, the items of information within each of the said groups of information being independent of each other and with no connection between them, whilst each of the items of information within one of the said groups of information corresponds to the same subject as one of the items of information within the other group of information, each item of information being disposed on a face of its support and indicated by a checking sign disposed on a face of the said support which is opposite the face on which the item of information is placed, the checking signs indicating the items of information corresponding to the subject, being identical.

Reference is now made to the accompanying drawings, in which:

FIG. 1 is a view in elevation of the face of a first embodiment;

FIG. 2 is a partial view taken in the direction D of FIG. 1;

FIG. 3 is a section taken on the line I—I of FIG. 1;

FIG. 4 is a section taken on the line II—II of FIG. 1;

FIG. 11 is a perspective view of a fourth embodiment;

FIG. 12 is a view in the direction A of FIG. 11;

FIG. 13 is a perspective view of a variation of the embodiment shown in FIG. 11;

FIG. 14 is a view in the direction B of FIG. 13;

Figure 5:
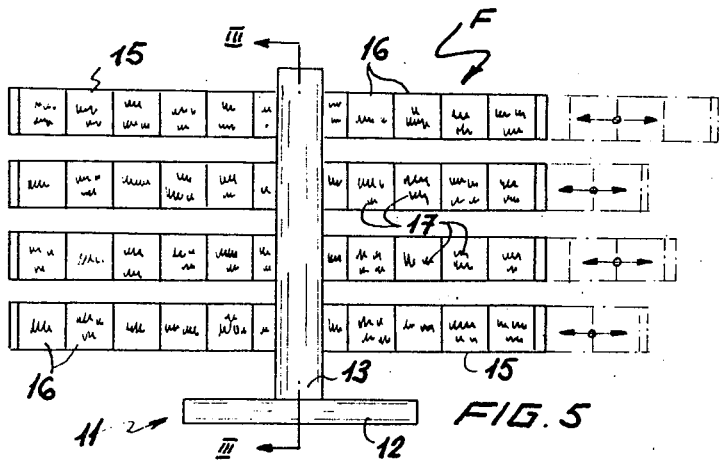
FIG. 5 is a view in elevation of the face of a second embodiment.

The device or teaching aid shown in FIGS. 1–4 comprises a frame 1 with a base 2 carrying two vertical uprights 3 located substantially at the ends of the base 2. Each upright 3 is pierced with four superposed vertical rectangular openings 4 (FIG. 4), the openings of one of the uprights 3 being in respective alignment with those of the other upright 3.

In each of the openings 4 of a pair of opposed openings is located one of the ends 5 of a rigid or flexible strip 6 extending between the two uprights 3. There are four strips disposed between the uprights 3, one above the other, and located vertically on their edges. There is a slide block or cursor 7 displaceable along each strip between the two uprights 3 through which the surface of the strip may be seen.

One of the faces of each of the strips 6 is divided into eleven divisions 8 disposed one after the other, and on each of which an item of information 9 is printed; this may consist for example, of a text, a drawing, a calculation, a formula or the like. The items of information 9 contained on the same strip are independent of each other and have no connection with each other. On the other hand, corresponding to each item of information 9 appearing on one of the strips 6 there is an item of information 9 carried on each of the other strips 6. In this manner the four strips comprise an assembly of eleven subjects each composed of four items of information respectively distributed over the four strips. The items of information relating to the same subject are not aligned in columns on the four strips but, on the contrary, are disposed at different points thereon. Hence, if one of the items of information relating to a given subject is disposed in the first division (on the left of the drawings) of the upper strip, the item of information relating to the same subject and appearing on the following strip may be placed in the last division thereof (on the right of the drawing) and so on. Each of the subjects appearing on the four strips 6 is accompanied by a monitoring sign 10 disposed on the face of the strips which is opposed to the face (i.e. the back) bearing the items of information (FIG. 2). Hence, to each item of information 9 carried by each of the strips there will correspond a checking sign 10 on the opposite face or back of the said strip, the signs relating to the same subject being identical. These signs 10 may be formed by lines, points, various designs or colours.

The items of information 9 carried by the strips 6 are of an instructional nature and relate, for example, to geometry, grammar, or any other branch of instruction.

The teaching aid is used as follows. The user displaces the slide block 7 on one of the strips 6 in one of the divisions 8 of this band. He has therefore selected an initial item of information 9 and he must then find on the fronts of the other strips the information corresponding to the subject to which the first item selected refers. He therefore displaces the slide blocks of the other bands to the divisions carrying the information which, in his opinion, corresponds to the subject concerned. When the four items of information are selected, it is only necessary for the user to turn the device over to check if his choice is correct. As stated above, items of information corresponding to the same subject are accompanied by the same checking sign 10. Consequently, if the backs of the slide blocks 7 are all located over the same checking signs 10, the items of information selected are correct. FIG. 2, which is a rear view of FIG. 1 in the direction D, shows the backs of four slide blocks 7 in position on the same checking sign 10, which corresponds to a correct selection. If, however, the backs of the slide blocks 7 cover signs different from each other, the selected information is incorrect.

The user therefore has the option of learning new material or of testing his knowledge, whilst there is always the possibility of checking the accuracy of his work.

Although the teaching aid shown comprises four strips each having 11 divisions carrying information, this arrangement is in no way a limitation and any number of strips and information may be used, the minimum being two strips. The strips used may be made of any material capable of receiving printing or printed matter. Due to their mounting in the uprights 3, the strips 6 are readily removable and therefore various sets of interchangeable strips may be used in only one frame and only one set of slide blocks, the latter being easily removed from and slid on the strips.

The device may be made with horizontal strips as shown, or with strips disposed vertically. It may even be used without the frame 1, the strips then being simply located on a table or held in the hand. Likewise the shape of the uprights 3 and the attachment of the strips thereto may be modified, the engagement being effected, if desired, externally of the uprights.

The teaching aid makes it possible to transpose any synoptic table, whatever the number of lines and columns in this table, whilst retaining the advantage that the information in the table is mixed and the user must work to discover these items of information.

Figure 6:
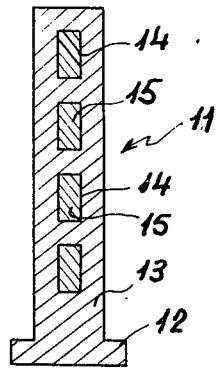
FIG. 6 is a section taken on the line III—III of FIG. 5.
Figure 7:
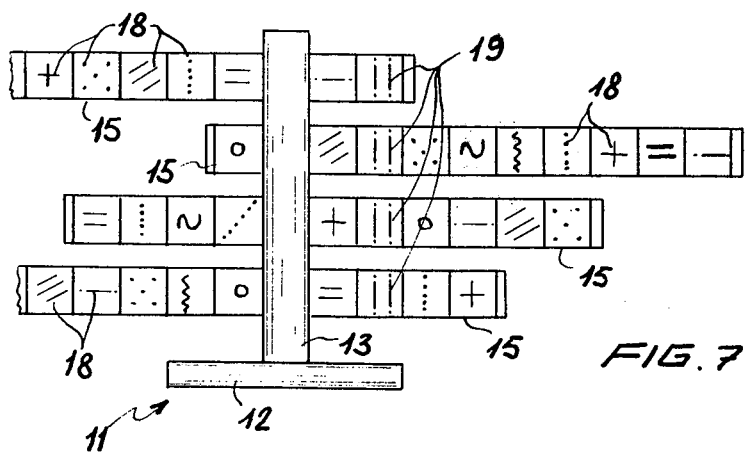
FIG. 7 is a partial view in the direction F of FIG. 5.

The device shown in FIGS. 5, 6 and 7 is a variant of that shown in FIGS. 1–4, and offers the same possibilities. It comprises a frame 11 having a base 12 carrying a single vertical upright 13 in which four superposed rectangular vertical openings 14 are formed (FIG. 6).

A substantially rigid strip 15 is slideably engaged in each of the openings 14, hence, four superimposed strips are obtained disposed in a vertical arrangement by their longitudinal edges. One of the faces of each of the strips is divided into eleven divisions 16 disposed one after the other, and on each of which an item of information 17 is printed as in the case of the strips in the embodiments shown in FIGS. 1–4. Here again, the items of information on the same strip are independent of each other, and an item corresponding to each item on one of the strips, is carried by each of the other strips, the items of information corresponding to a given subject not being positioned in the same place on the four strips.

Each of the subjects appearing on the four strips is accompanied by a checking sign 18 on the face (or back) of the strip 15 which is opposite the face carrying the information 17 (FIG. 7). Therefore a checking sign 18 on the opposite face of the said strip will correspond with each item of information carried by each of the strips 15, since the checking signs relating to the same subject are identical.

This device is used as follows. The user selects from one of the bands a division 16 referring to an initial item of information. He then seeks on the other strips the items of information corresponding to the subject to which the first selected item of information refers, and brings the divisions 16 concerned, one above the other by sliding the strips 15 in the upright 13. When the four divisions which are presumed to correspond with the subject concerned are vertically aligned, it is only necessary for the user to reverse the support 11 to check if his choice is correct. If this is the case, the checking signs 18 corresponding to the selected subject are vertically aligned. If, on the other hand, the control signs corresponding to the treated subject are not vertically aligned, then at least one of the items of information selected and brought into vertical alignment is incorrect. FIG. 7, which represents the device seen from the rear in the direction F, shows an alignment 19 of identical control signs.

Figure 8:
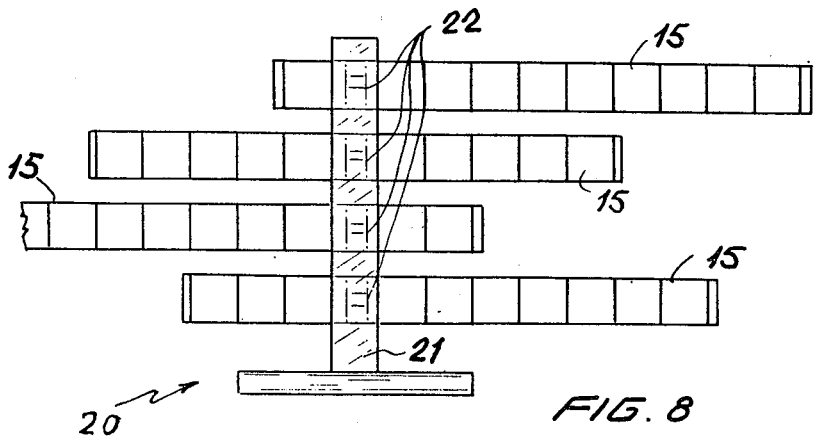
FIG. 8 is a view similar to that of FIG. 7, but showing a different setting.

The device shown in FIG. 8 is similar to that of FIGS. 5, 6 and 7, the only difference residing in that it comprises a support 20, the upright 21 of which is transparent. In this case, the selected items of information are aligned along the upright 21 so as to be seen through it. Similarly, the checking signs will be seen through the rear of the upright 21. FIG. 8 shows an alignment of checking signs 22 visible through the upright 21.

Figure 9:
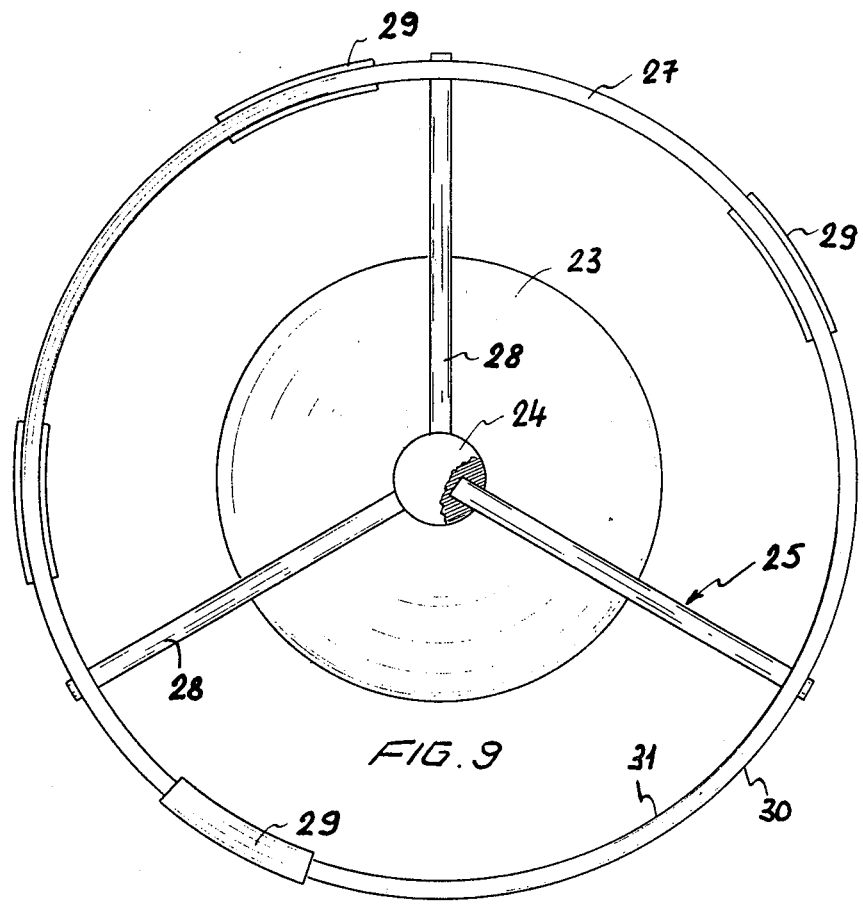
FIG. 9 is a plan view of a third embodiment.
Figure 10:
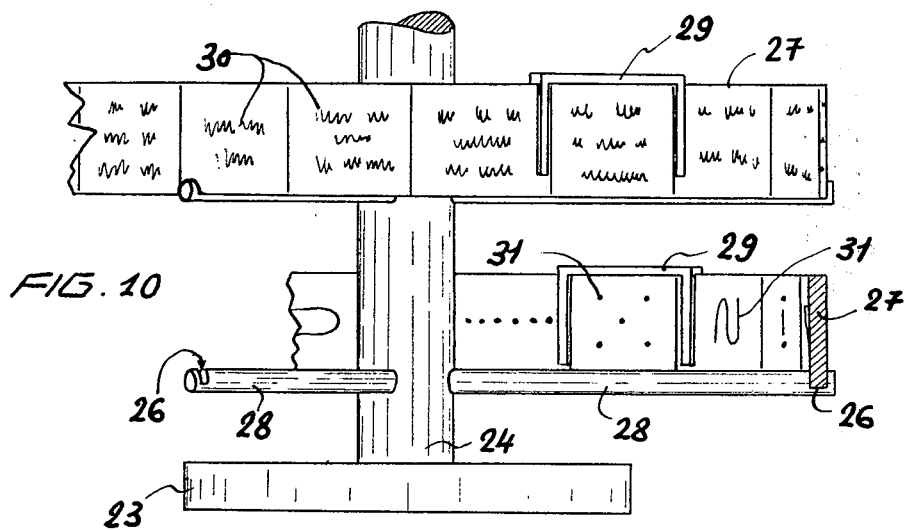
FIG. 10 is an elevation partly in section of FIG. 9.

The embodiment shown in FIGS. 9 and 10 uses the principle of FIGS. 1 to 4 and offers the same possibilities. The difference resides in the shape of the strips and the support, and in the securing of the strips thereto. In this case the support comprises a base 23 on which a vertical upright 24, comprising four superimposed horizontal brackets 25, is mounted to rotate, or is fixed. Each bracket 25 comprises three horizontal arms 28 disposed at an angle of 120° respectively to each other and engaged in the upright 24. Each arm 28 has a transverse groove 26 on its free end. Each of the brackets 25 carries a circular strip 27, one of the longitudinal edges of which is engaged in the grooves 26 of the arms 28. The strips 27 are therefore disposed one above the other and around a centre support. Each circular strip 27 may be formed from a straight length, the ends of which are joined by sticking or stapling.

A slide 29 displaceable along the strip and through which the surface of the strip may be seen, is mounted on each of the strips 27. The arrangement of the items of information and the checking signs is effected as in the case of the first embodiment described above, with the items of information 30 on the outer faces of the strips whilst the checking signs are on the inner faces. FIG. 10 shows the items of information 30 which are visible on the upper strip, whereas the lower band is in section so as to permit a view of the checking signs 31.

The use of this embodiment is the same as that of the embodiment shown in FIGS. 1 to 4, except that in cases in which the upright 24 is rotatable, the user will be able to rotate the assembly of strips without the base 23. The strips are also easily interchangeable and at the same time may be used without their support. In one variant the upright 24 is divided into four sections, the first of which is rotated in the base 23 whilst the second section rotates in the first, and so on. Each strip is carried by brackets connected to one of the sections of the centre upright and the strips can therefore turn individually.

As in the case of the preceding embodiments, the number of strips is not limited to four and the minimum is two. Likewise, the quantity of information appearing on each strip may be selected as desired.

The device shown in FIGS. 11 and 12 is composed of four cubes 32 of identical dimensions. Each of the faces of the cubes 32 carries an item of information 33 which, as in the preceding cases, is of an instructional nature and may consist of a text, a drawing, a calculation and so on. The items of information contained in the same cube are independent of each other and have no connection between them. However, corresponding to the item of information 33 appearing on one of the faces of one of the cubes 32 is the item of information 33 carried by one of the faces of each of the other cubes 32, these items of information corresponding however only for one series of faces at a time. An assembly of six subjects, each composed of four items of information respectively distributed over the four cubes 32 will therefore be found on said cubes 32, and only one subject at a time may be selected.

Each of the subjects appearing on the four cubes is indicated by a checking sign 34 which, in the embodiment described, is formed by lines, dashes, dots or combinations thereof. For each cube, these monitoring signs 34 are respectively disposed, for each item of information, on the face which is opposite to the face carrying the said information. Hence, a monitoring sign 34 on the opposite face of one of the cubes 32 will correspond to the information carried by one of the faces of the cubes 32, the monitoring signs relating to the same subject being identical. Since the monitoring signs are disposed on faces which carry items of information, these monitoring signs will have to be effected in such manner as to avoid interference with the information adjacent to them. For this purpose it is preferable to make use of monitoring signs formed by lines, dots and dashes, for these can be easily placed on the edges of the faces. This method of procedure is in no way a limitation, however, and the monitoring signs may include various designs or colours.

The described device is used as follows: The user selects a face of one of the cubes 32 to select an initial item of information 33. He then looks on the other cubes for the items of information which, in his opinion, correspond to the subject to which the first item of information selected refers. When the four items of information are selected, it is only necessary for the user to look at the faces of the cubes which are opposite those on which the selected items of information appear to check if his choice is correct. FIG. 12, which shows the cubes of FIG. 11 as a rear view in the direction A, shows on the four front faces of the cubes four identical monitoring signs 34, each of these signs in this case being formed by two straight lines edging the face of the cube. This therefore means that the items of information appearing on the opposite faces of the cubes, i.e. the items of information which in FIG. 11 are carried by the front faces of the cubes, corresponding to the same subject.

In this embodiment, the number of cubes 32 is not a limitation and it is also possible to make use of three-dimensional bodies other than cubes, for example, parallelopipeds, rectangular or other types of prisms having an even number of side faces, and these three-dimensional bodies or elements of the device may be used extending horizontally or vertically. Here again the device makes it possible to transpose any synoptic table, whatever number of lines or columns may be contained in this table, with the advantage that the items of information are mixed and must be selected by the user. Moreover, due to the fact that the items of information correspond with only one series of faces at a time, then when a selection has been made, the items of information on the other faces of the cubes do not correspond and have to be re-selected each time.

The modified embodiment shown in FIGS. 13 and 14 differs from the embodiment in FIGS. 11 and 12 in the sense that the cubes 32 are disposed in a model, in this case a tower 35 traversed by four transverse superimposed passages 36 having a square cross-section and forming passages for the cubes 32. FIG. 13 shows the cubes partly engaged in the passages 36. FIG. 14 shows a rear view of the tower 35 in the direction B of FIG. 13, with the faces 37 of the cubes 32 which are opposite the faces 38 of the said cubes which are visible through the front face of the tower 35. Naturally, the model illustrated is not a limitation and may be replaced by any other suitable support or vertical or horizontal arrangement.

Figure 15:
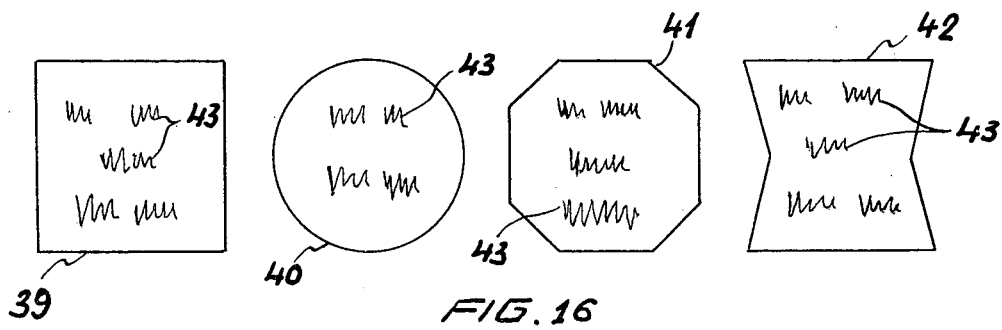
FIG. 15 is a plan view of a fifth embodiment.
Figure 16:
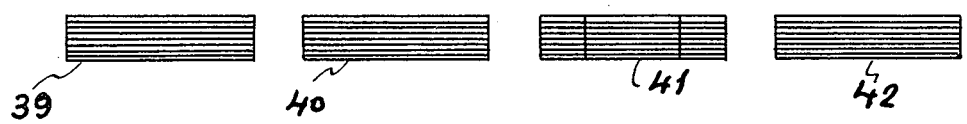
FIG. 16 is an elevation thereof.
Figure 17:
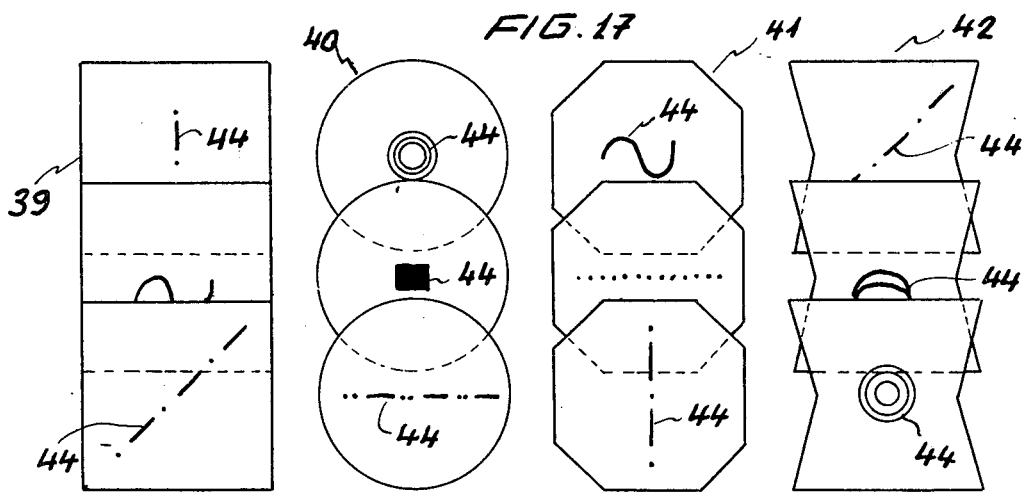
FIGS. 17 and 18 show details of this fifth embodiment.
Figure 18:
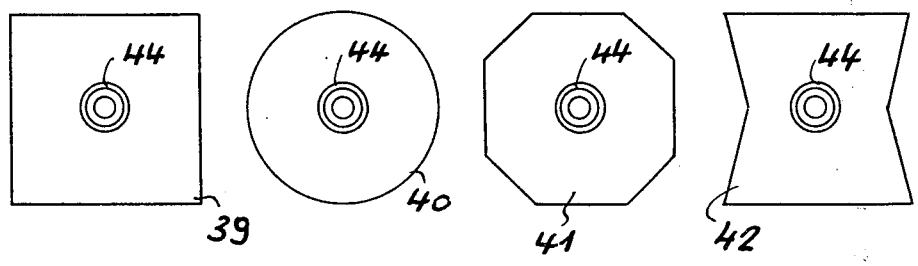

The device shown in FIGS. 15 to 18 is formed by four series of cards or plates 39, 40, 41 and 42, each series of cards having a different shape. Each of the cards of each series carries an item of information 43 of an instructive nature on one of its faces, whilst the opposite face or back, carries a checking sign 44 corresponding with the said item of information. The items of information appearing on the same series of cards are independent of each other and have no connection between them. The information carried by one of the cards of one series corresponds to the information carried by one of the cards of each of the other series, and the corresponding items of information are all carrying the same checking sign 44. FIG. 15 shows the cards 39, 40, 41 and 42 and the items of information 43 which they carry on one of their faces. FIG. 16 shows an elevation view of the cards 39–42 in stacked arrangement. FIG. 17 shows the backs of three of these identical cards with the checking signs 44 and FIG. 18 shows a card of each series with the same checking sign 44.

This device is used as follows:

The user choses a card of a series to select an initial item of information 43. Then, from the other series of cards, he looks for the card of each of these series which, in his opinion, corresponds to the subject concerned by the first item of information selected. When four cards are chosen, it is only necessary to turn them over to check whether the choise is correct, in which case the checking signs appearing on the back of the chosen cards must be the same, as shown in FIG. 18.

As in the other embodiments described, the number of cards or plates of each series and the number of series of cards are not limited and the device permits the transposition of any synoptic table with the advantage ohat the items of information are mixed and it is the user who has to select them, whilst retaining the possibility of checking the correctness of his choice.

Although they are described as having different shapes, the cards 39–42 may all have the same shape, but partly or completely different in colour for each series, and the checking signs may be of any type, for example, designs, lines, points, or colours. As in the case of the cubes in the embodiment shown in FIGS. 13 and 14, the cards 39–42 may be contained, one at a time or several at a time, in a suitable model or engaged or inserted in any support.

The various embodiments of the apparatus according to the present invention are all simple to construct and may be made of any suitable material. They all have the advantage of compelling the user to make a choice, whilst offering him the possibility of checking the accuracy of his choice by means such as colours, designs, an assembly of lines, dots or the like, these checking means always being disposed on a surface opposite the surface carrying the information. The information supports (plates, cards, strips, prisms) may be flat (plates, cards, strips) or three-dimensional, or integrated on the faces of a prism, thus providing an infinite number of possible constructions. There is only one possibility of correspondence for the various items of information relating to the same subject, and the checking means do not allow of any ambiguity in checking the choice. The number of information supports is not limited, and consequently the number of subjects treated may be increased, whilst subjects of all kinds may be dealt with; finally the various embodiments of the device of the present invention may be integrated in a figurative arrangement, as described for the cubes and cards, whilst the supports of the strips may also be composed of a figurative model, such as for example, a tower, a mery-go-round, an obelisk and so on.

Due to its construction and the checking means, the device of the present invention is simple to operate and may be used without difficulty even by small children. Moreover, the handling of the bands, slides, cubes, prisms, cards or plates resembles a game to the child who learns whilst amusing himself.

What I claim is:

1. A teaching aid comprising:
   a. at least two groups of items of information respectively distributed over a plural number of stationary information supports, the items of information within each of said groups of information being independent of each other with no connection between them whilst each of the items of information within one of said groups of information corresponds to the same subject as one of the items of information within the other group of information; and,
   b. a checking sign for indicating each item of information, said checking signs disposed on a face of said information supports which is opposite the face on which the items of information are placed, and the checking signs indicating the items of information corresponding to the same subject being identical.

2. A teaching aid according to claim 1, wherein
   a. each of the information supports is a strip on one face of which the items of information of one of the groups of information are disposed, one after the other;
   b. the checking signs indicating each item of information are disposed on the other side of the strip, one after the other at the level of the corresponding item of information; and
   c. the items of information relating to the same subject are not disposed at the same level on said strips.

3. A teaching aid according to claim 2, wherein said strips are straight.

4. A teaching aid according to claim 3, further including two uprights, and wherein the strips are removably secured between said two uprights on which they are located with their edges facing each other.

5. A teaching aid according to claim 2, further comprising a removable slide displaceably engaged on each of said strips, said slide indicating in succession each of the items of information carried by the strip similarly to the corresponding checking sign.

6. A teaching aid comprising:
   a. at least two stationary strips;
   b. at least two groups of items of information, the items of information within each group distributed one after the other over one face of one of said strips, said items of information within each group being independent from each other with no connection between them, whilst each of the items of information within one of said groups of information corresponds to the same subject as one of the items of information within the other group of information and the items of information relating to said same subject are not disposed at the same level on said strips;
   c. a plurality of checking signs respectively distributed one after the other over the other face of said strips, each of said checking signs indicating an item of information and being located at the level of said item of information, the checking signs indicating the items of information relating to the same subject being identical; and
   d. a removable slide displaceably engaged on each of said strips, said slide indicating in succession each of the items of information carried by the strip similarly to the corresponding checking sign.

7. A teaching aid according to claim 6, wherein said strips are straight.

8. A teaching aid according to claim 7, further including two uprights, and wherein said strips are removably secured between said two uprights on which they are located with their edges facing each other.

* * * * *